(12) United States Patent
Tokui (10) Patent No.: US 9,832,390 B2
(45) Date of Patent: Nov. 28, 2017

(54) IMAGE CAPTURING DEVICE

(71) Applicant: Sharp Kabushiki Kaisha, Sakai-shi, Osaka (JP)

(72) Inventor: Kei Tokui, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/118,629

(22) PCT Filed: Feb. 17, 2015

(86) PCT No.: PCT/JP2015/054246
§ 371 (c)(1),
(2) Date: Aug. 12, 2016

(87) PCT Pub. No.: WO2015/125769
PCT Pub. Date: Aug. 27, 2015

(65) Prior Publication Data
US 2017/0048443 A1 Feb. 16, 2017

(30) Foreign Application Priority Data

Feb. 20, 2014 (JP) .................................. 2014-030974

(51) Int. Cl.
*H04N 5/235* (2006.01)
*H04N 5/232* (2006.01)
*H04N 5/369* (2011.01)

(52) U.S. Cl.
CPC ......... *H04N 5/2356* (2013.01); *H04N 5/2353* (2013.01); *H04N 5/2355* (2013.01); *H04N 5/23212* (2013.01); *H04N 5/23216* (2013.01); *H04N 5/23219* (2013.01); *H04N 5/23245* (2013.01); *H04N 5/23293* (2013.01); *H04N 5/369* (2013.01)

(58) Field of Classification Search
None
See application file for complete search history.

(56) References Cited

U.S. PATENT DOCUMENTS

| 2006/0044444 | A1* | 3/2006 | Okamoto | H04N 5/232 348/333.05 |
| 2009/0225199 | A1* | 9/2009 | Ferren | H04N 5/23212 348/240.99 |
| 2013/0120615 | A1 | 5/2013 | Hirooka et al. | |
| 2014/0063330 | A1* | 3/2014 | Matsuyama | H04N 5/2356 348/352 |
| 2014/0176758 | A1* | 6/2014 | Fujita | H04N 5/23245 348/223.1 |

(Continued)

FOREIGN PATENT DOCUMENTS

JP 2013-106113 A 5/2013

*Primary Examiner* — Wb Perkey
(74) *Attorney, Agent, or Firm* — Keating & Bennett, LLP (57) ABSTRACT

A first photographing mode in which plural pieces of image information are acquired while a configuration of an exposure is fixed and a focus position is changed and a second photographing mode in which plural pieces of the image information are acquired while the focus position is fixed and the configuration of the exposure is changed are included, and image processing is performed from the pieces of image information that are acquired in the first photographing mode and the second photographing mode.

8 Claims, 7 Drawing Sheets

(56) References Cited

U.S. PATENT DOCUMENTS

2015/0130981 A1* 5/2015 Hagiwara .......... H04N 5/23293
            348/333.02
2017/0048443 A1* 2/2017 Tokui ................ H04N 5/23216

* cited by examiner

FIG. 6C (a) FIRST PHOTOGRAPHING MODE (b) SECOND PHOTOGRAPHING MODE

IMAGE CAPTURING DEVICE

TECHNICAL FIELD

The present invention relates to techniques of an image capturing device, particularly to an image capturing device that is capable of increasing a depth of field and a dynamic range from plural photographed images.

BACKGROUND ART

As a technique for capturing a clear image in focus, an autofocus technique has been known in which the focus is automatically adjusted to a prescribed position. As schemes of the autofocus techniques, a phase difference scheme, a contrast scheme, and so forth have been known. In recent years, an autofocus of the contrast scheme is installed in many compact digital cameras and cameras installed in smart phones. Those techniques cause an object in focus to be recorded clearly and an object out of the range of the depth of field to be recorded in a blurry condition in one image as a photographed image.

Meanwhile, in recent years, high-speed consecutive photographing has become possible, and a technique has been developed that composes an image with an increased depth of field from plural consecutively photographed images. Such a technique enables acquisition of an image in which objects in a wide range from a close view to a distant view are simultaneously focused.

However, due to the increase in the depth of field, gradation saturation in a partial area in an image, which has not been a problem in related art, is recognized as degradation of image quality. For example, in a case where a person in a close view is photographed and where the gradation is saturated due to a too bright distant view, an object that would be photographed in focus becomes an image similar to a blurry object in related art.

Thus, a technique has been suggested that is capable of increasing the depth of field and the dynamic range, and one example is PTL 1. One embodiment of PTL 1 discloses a method in which photographing is performed by adjusting the focus for each sensitivity of an image capturing apparatus and composition from plural photographed images is thereby performed. However, in this method, degradation of image quality occurs around the object that is photographed out of the depth of field. PTL 1 discloses this fact. Thus, another embodiment of PTL 1 discloses that photographing is performed for each of photographing sensitivities while the focus is changed and composition from plural images is thereby performed. That is, the dynamic range is increased by images at different sensitivities in which the depth of field is increased, or the depth of field is increased by images in different focuses in which the dynamic range is increased, and increases in the depth of field and the dynamic range are thereby realized.

CITATION LIST

Patent Literature

PTL 1: Japanese Unexamined Patent Application Publication No. 2013-106113

SUMMARY OF INVENTION

Technical Problem

However, the above method has problems described below.

In a case where the depth of field and the dynamic range are increased by the technique disclosed in PTL 1, the photographing time and processing time increase.

For example, in a case where the configurations of exposure are three levels of high sensitivity, intermediate sensitivity, and low sensitivity and the focus positions are three levels of close view, intermediate view, and distant view, the method of PTL 1 requests 9 (3×3) photographing actions because photographing is performed for each of the sensitivities and each of the focus positions. In a case where the object moves in the period for performing this process, the composition may not be performed by causing the photographed objects to overlap with each other, and the object becomes a double image, causing degradation of image quality. That is, in the method of PTL 1, because the number of photographed images increases, degradation of image quality highly possibly occurs due to movement of the object and camera shake. In a case where the composition is performed by using consecutively photographed images, it is desired to perform photographing in as a short time as possible in order to compose an image that is not influenced by movement of the object.

Further, the time for composition increases in a case where the photographed images increase, and the waiting time of the user also increases. For example, in a case where a dark object is present in a close view, an image of the close view at the high sensitivity is important, and it is possible that images that are not used for the composition are present. That is, in PTL 1, because photographing is performed in each of sensitivity conditions and focus positions, the processing amount increases due to image processing for each image. In a case where the composition is performed by using consecutively photographed images, it is desired to photograph as few images as possible in order to reduce the processing amount for the composition.

In addition, PTL 1 discloses a method of focusing at each of the sensitivities. However, because the focus degree at each of the sensitivities has to be evaluated, time is requested before photographing starts, and the possibility of missing a photographing opportunity increases. Further, in a case where photographing is performed in predetermined photographing conditions, the possibility that an image is not correctly composed increases because the photographing suitable for a photographed scene may not be performed or many photographing conditions are present.

The present invention has been made in consideration of the above problems, and an object thereof is to provide an image capturing device that reduces the number of photographed images, provides high image quality, and reduces a processing amount in a case where a depth of field and a dynamic range are increased.

Solution to Problem

One aspect of the present invention provides an image capturing device including: an image sensor that acquires image information in accordance with a focus position and an exposure which are configured; a control unit that controls the focus position and a configuration of the exposure; and an image processing unit that performs image processing for the image information, in which the control unit includes a first photographing mode in which the image information is acquired while the configuration of the exposure is fixed and the focus position is changed and a second photographing mode in which the image information is acquired while the focus position is fixed and the configuration of the exposure is changed, and the image processing unit performs the image processing from pieces of image information that are acquired in the first photographing mode and the second photographing mode.

This specification incorporates the contents disclosed in the specification and/or the drawings of Japanese Patent Application No. 2014-030974, upon which the priority of this application is based.

Advantageous Effects of Invention

In an image capturing device according to the present invention, images requested for composition may be photographed in short time, and an image in which a depth of field and a dynamic range are increased may be composed with high image quality. Further, in such a case, the composition may be performed while a processing amount is reduced.

BRIEF DESCRIPTION OF DRAWINGS

FIG. 6C(a) is a flowchart that illustrates a flow of a process of a first photographing mode of a first photographing mode control unit. FIG. 6C(b) is a flowchart that illustrates a flow of a process in a second photographing mode.

DESCRIPTION OF EMBODIMENTS

Embodiments of the present invention will hereinafter be described in detail with reference to drawings. Representation in the drawings is emphasized to facilitate understanding and may be different from reality.

First Embodiment

Figure 1:
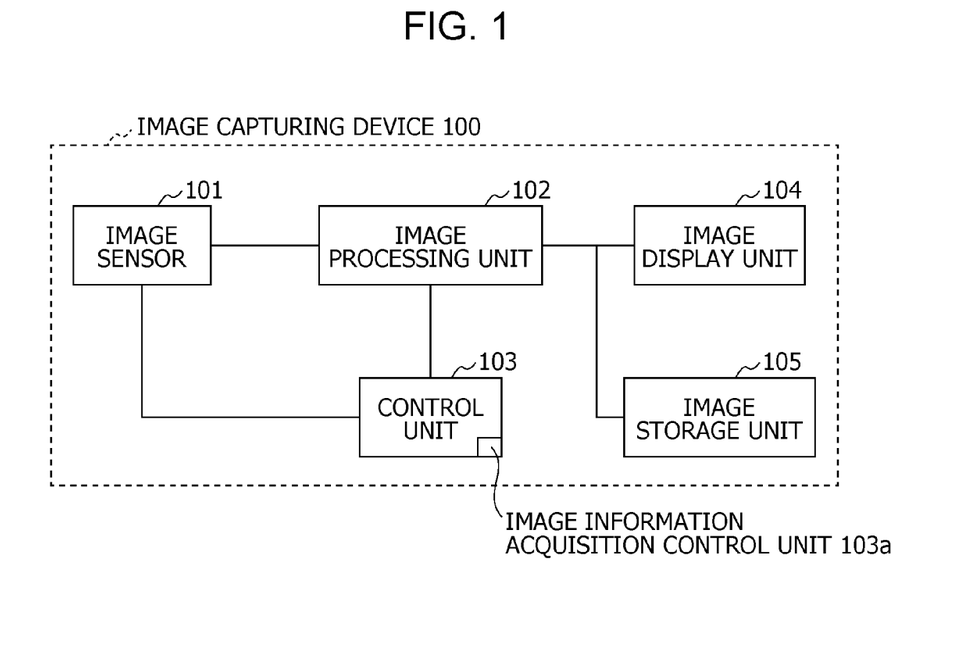
FIG. 1 is a diagram that illustrates a configuration example of an image capturing device of the present invention.

FIG. 1 is a function block diagram that illustrates one configuration example of an image capturing device according to a first embodiment of the present invention. An image capturing device 100 of this embodiment includes an image sensor 101, an image processing unit 102, a control unit 103, an image display unit 104, and an image storage unit 105. A reference numeral 103a will be described later.

The image sensor 101 acquires image information and is configured with a solid state image sensor such as a charge coupled device (CCD) or a complementary metal oxide semiconductor (CMOS) sensor, a lens, and so forth. A light exposure time and a sensitivity in a case of acquiring an image are exposure conditions configured by the control unit 103. Further, the image sensor 101 includes components and mechanisms for adjusting the focus and is realized by driving the lens or driving a liquid lens or the like by an actuator, for example. The acquired image information is transmitted to the image processing unit 102.

The image processing unit 102 performs image processing for the transmitted image information. In the image processing, in addition to a process described later for composing an image in which the depth of field and the dynamic range are increased, proper processes such as noise reduction, sharpening, chroma enhancement, contrast enhancement, white balance, gamma correction, and file compression are appropriately performed.

The control unit 103 controls the focus, exposure, and so forth, which are conditions of photographing by the image sensor 101, based on the image information that is acquired by the image sensor 101. One example is focus control by the contrast scheme or the like.

The image processing unit 102, the control unit 103, and so forth may be realized by software processing by a central processing unit (CPU) or a graphic processing unit (GPU) or hardware processing by an application specific integrated circuit (ASIC) or a field programmable gate array (FPGA).

The image display unit 104 displays the image information for which the image processing is performed by the image processing unit 102. The displayed image information is a preview image at a time before photographing, a photographed image, or the like. The image display unit 104 is configured with a liquid crystal display, an organic electro luminescent (EL) display, or the like.

The image storage unit 105 is capable of storing the photographed image information in a compressed manner or non-compressed manner and causes a storage medium such as a flash memory or a hard disk that is mounted on the image capturing device 100 to store the image information.

Figure 2:
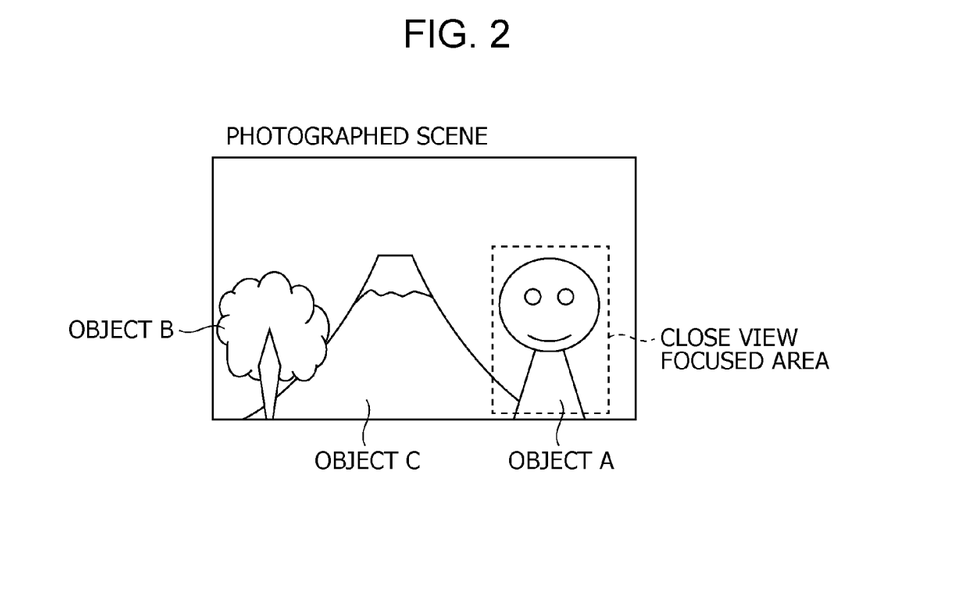
FIG. 2 illustrates an example of a photographed scene.
Figure 3:
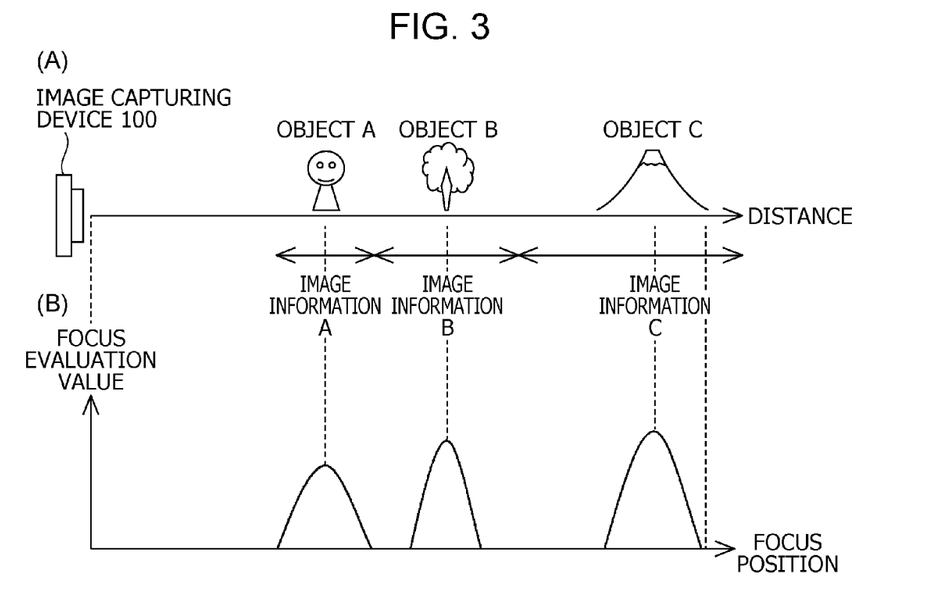
FIG. 3 illustrates an example of a photographed scene.

FIG. 2 illustrates an example of a scene that is photographed by the image sensor 101. It is assumed that in a photographed scene, an object A, an object B, and an object C, whose distances from the image capturing device 100 are different, are present. As illustrated in FIG. 3(A), the object A, the object B, and the object C are present in the order of closeness from the image capturing device 100. The control unit 103 adjusts the focus position from information or the like obtained from the image sensor 101. In techniques of increasing the depth of field in related art, particularly in a case of focusing all objects from a close view to a distant view, a focusing operation does not have to be performed. However, in this embodiment, proper focus position adjustment is performed in order to increase the depth of field and increase the dynamic range. Techniques used in related art may be used for evaluation of the focus degree for the focus position adjustment. For example, contrasts among pixels in areas of an image are calculated, and the evaluation may be performed by the magnitudes and amounts of the contrasts. For example, in the scene in FIG. 2, because the objects are present in the close view, an intermediate view, and the distant view, as illustrated in FIG. 3(B), focus evaluation values as evaluation values of the focus degrees are high in the respective positions in which the object A, the object B, and the object C are in focus.

The image capturing device in this embodiment has at least two photographing modes in order to increase the depth of field and photographs plural images whose focus positions are different in a first photographing mode. In this case, the focus position for the close view is set as the focus position in which the object A is in focus, and photographing is performed while the focus position is sequentially changed toward the distant view. In FIG. 3(A), as three pieces of image information with different focus positions, image information A that includes the object A in the depth of field, image information B that includes the object B in the depth of field, and image information C that includes the object C in the depth of field are acquired. Further, in a case where the plural pieces of image information are acquired while the focus position is changed, photographing is performed while an exposure configuration is fixed. Here, the exposure configuration of the first photographing mode is configured by applying a weight such that the exposure is adjusted to the object A determined as the close view. For example, the image information is divided into plural areas, the focus evaluation value is calculated for each of the areas, and the objects in which distances are included more in the each of the areas may thereby be estimated. The areas that include more objects in the close view are weighted, and the exposure is configured by automatic exposure configuration techniques in related art. As an automatic exposure configuration in related art, for example, a method of calculating the exposure by a saturated pixel ratio, a pixel average value, and so forth in a target area may be used. Accordingly, in a case where photographing is performed in a state where the exposure is adjusted to the object in the close view in the first photographing mode and an image in which the exposure is adjusted to the object in the distant view is photographed in a second photographing mode described later, the dynamic range may efficiently be increased.

Figure 4:
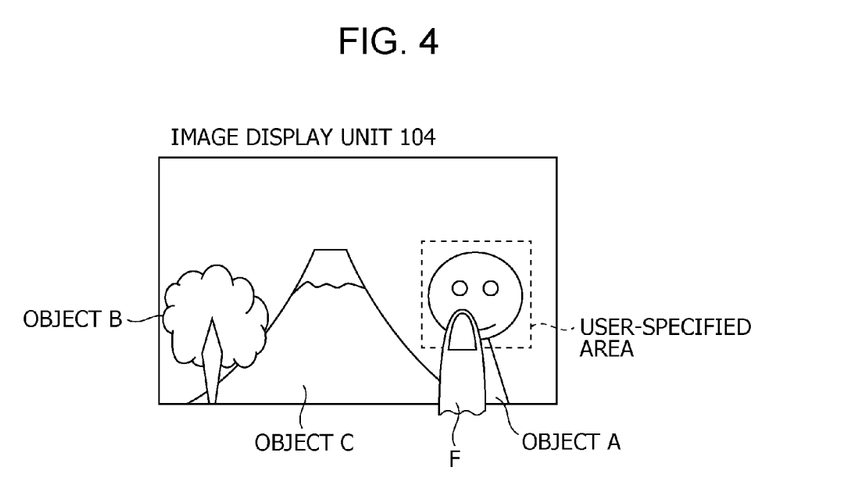
FIG. 4 is a diagram that illustrates specification of an object by a user.

Here, the focus position of the object in the close view may be decided by selecting the greatest value of the closest view for which the focus evaluation value exceeds a configured threshold value. Further, a similar effect may be obtained by specifying the object in the close view by a user. For example, the image display unit 104 is formed as a touch panel as a user configuration unit, and the focus position, in which the object in a user-specified area that the user specifies by touching by a finger F as in FIG. 4 is focused, may thereby be configured as the close view. The focus position in the distant view may be a predetermined focus position in the distant view, the focus position in the most distant view that is configurable, or the focus position that is calculated with the depth of field and the number of photographed images and may appropriately be configured.

In addition, in this embodiment, a description is made about the method in which photographing is performed while the focus position is changed from the close view toward the distant view. However, the focus position may be changed from the distant view toward the close view. In this case, the focus position in the most distant view may be decided by selecting the infinity or the greatest value of the most distant view for which the focus evaluation value exceeds a configured threshold value. Further, the user may specify the focus position by a touch panel. In a case where the focus position is adjusted to the object in the distant view, the exposure is configured by weighting the object in the distant view. The focus position in the close view may be a predetermined position or the position in the closest distant view for which the focus configuration is feasible, may be calculated from the focus evaluation value, and may appropriately be configured. As described above, the change in the focus position may similarly be carried out from the distant view toward the close view.

Next, as the second photographing mode, three pieces of image information are acquired while the focus position is changed, and pieces of image information are thereafter acquired while the control unit 103 fixes the focus position and the exposure configuration is changed. That is, in a state where the object C in the focus position in the most distant view is in focus, images in different exposure configurations are acquired. The photographing mode in which the focus position is changed and the photographing mode in which the exposure configuration is changed may be performed independently from each other. However, sequential performance of those may reduce the influences of movement of the object and camera shake and is thus preferable.

This is because the exposure configuration is adjusted to the close view when photographing is performed while the focus position is changed and thus the exposure configuration is possibly not adjusted to the object in the distant view. In a case where two objects are arranged closely to each other, illumination light applied to both of the objects are in similar states, and it is thus highly possible that the brightness is at similar levels. Accordingly, it is highly possible that the objects at similar distances from the image capturing device may be photographed in the same exposure configuration. On the other hand, illumination light applied to both of the objects is possibly different in a case where two objects are arranged distantly form each other, such as outside a room and inside the room or a sunny place and shade, for example. That is, in a case where the two objects are arranged distantly from each other, it is highly possible that the brightness is largely different, and the scene has a wide dynamic range.

Accordingly, the photographed scene with a wide dynamic range is often a case where the distance between the objects is large. In a case where the objects in the close view and the distant view are simultaneously photographed, the exposure configuration for either one of the objects is possibly not proper. Thus, in this embodiment, photographing in different exposure configurations is performed for the close view and the distant view that may result in a wide dynamic range, and the objects with different brightness are thereby photographed. The difference in the exposure configuration may be adjusted by the light exposure time even in an image capturing apparatus without a diaphragm. The gradation in a dark area becomes good in a case where the light exposure time is extended. The gradation in a bright area becomes good in a case where the light exposure time is shortened.

Here, in a case where images in different exposure configurations are acquired by moving the focus position from the distant view to the close view, the image information is acquired by fixing the focus position to a prescribed position in the close view and by changing the exposure configuration.

The image information photographed by changing the focus and image information photographed by changing the exposure configuration, for which the control unit 103 controls the focus position and the exposure configuration, are transmitted to the image processing unit 102, and image processing thereof is performed. An image in which the depth of field and the dynamic range are increased is composed by this image processing.

Figure 6A:
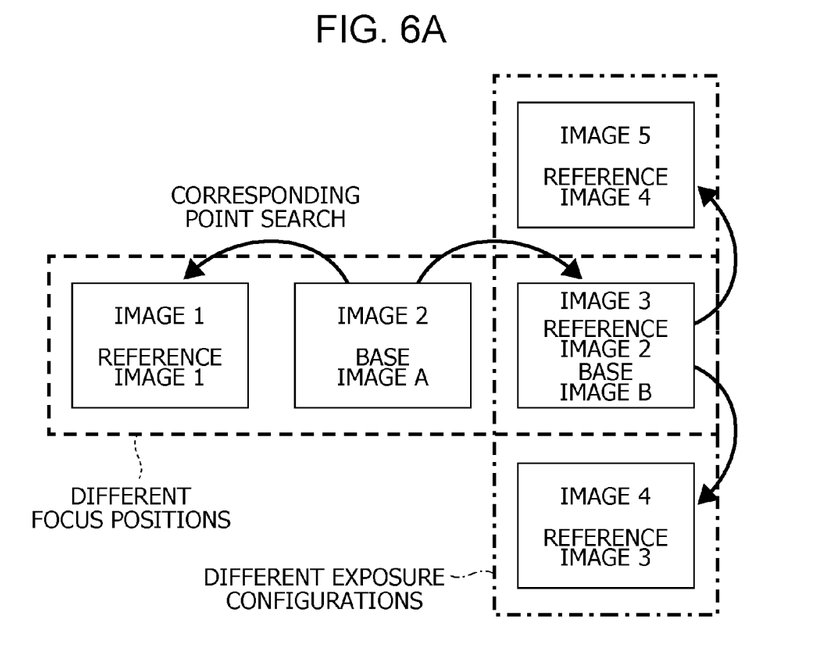
FIG. 6A is a diagram that illustrates the relationship between base images and reference images in the correction amount calculation.
Figure 6B:
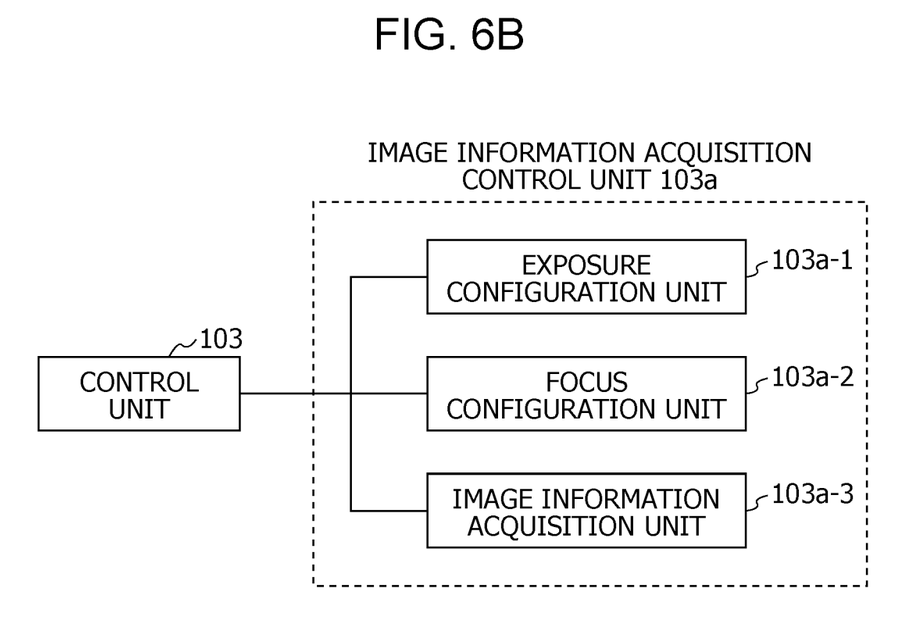
FIG. 6B is a function block diagram that illustrates one configuration example and a specific configuration example of an image information acquisition control unit 103a of a control unit 103.
Figure 6C:
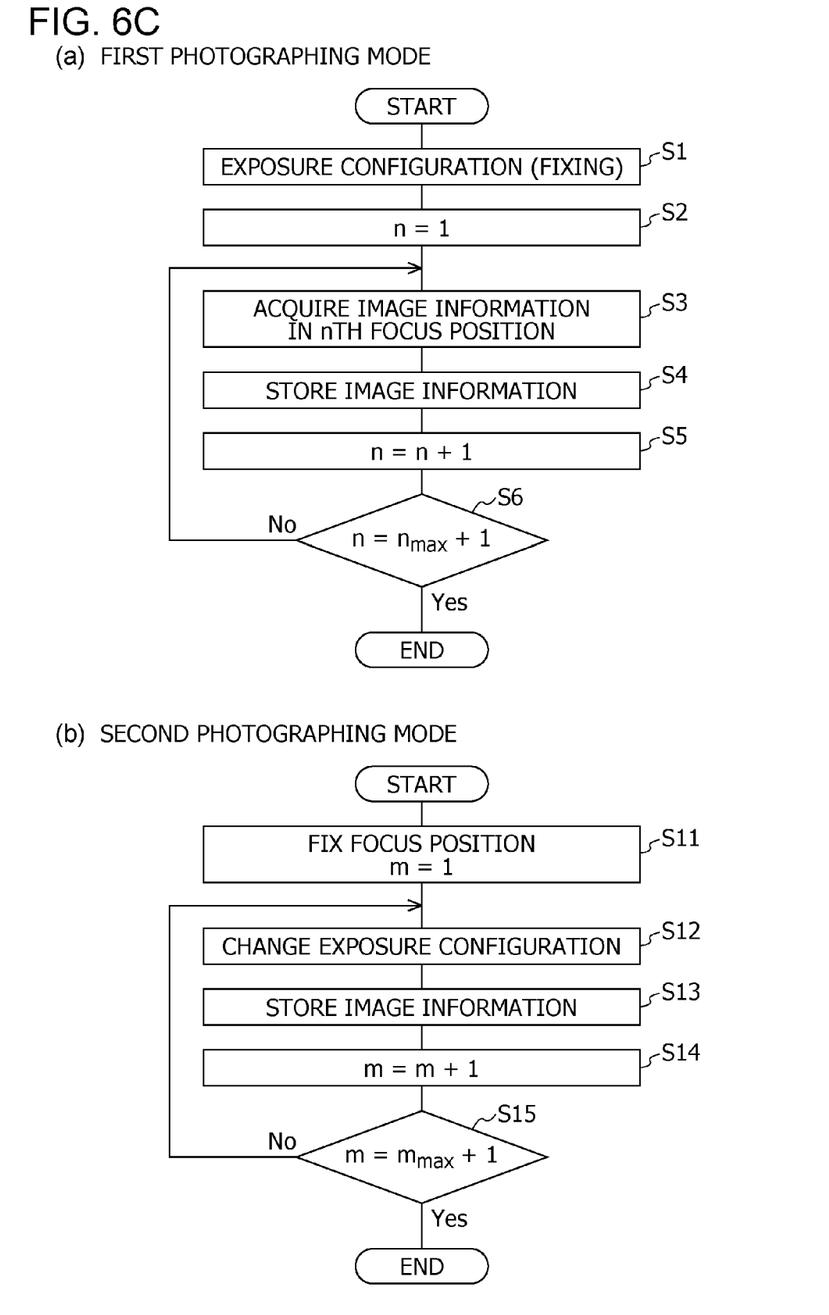

FIG. 6B is a function block diagram that illustrates one configuration example of an image information acquisition control unit 103*a* of the control unit 103. The image information acquisition control unit 103*a* includes an exposure configuration unit 103*a*-1 that configures the exposure in a case of acquiring the image information, a focus configuration unit 103*a*-2 that configures the focus position, and an image information acquisition unit 103*a*-3 that acquires the image information and controls storage thereof in a memory or the like. The image information acquisition control unit 103*a* changes control for acquiring an image in accordance with whether the control unit 103 performs control in the first photographing mode or the second photographing mode.

In a case where photographing is performed in the first photographing mode, the exposure configuration unit 103*a*-1 performs a configuration so as to fix the exposure configuration, the focus configuration unit 103*a*-2 performs configuration so as to change the focus position, and the image information acquisition unit 103*a*-3 stores each image in the memory or the like. Meanwhile, in a case where photographing is performed in the second photographing mode, the exposure configuration unit 103*a*-1 performs a configuration so as to change the exposure configuration, the focus configuration unit 103*a*-2 performs a configuration so as to fix the focus position, and the image information acquisition unit 103*a*-3 stores each image in the memory or the like.

FIG. 6C(a) is a flowchart that illustrates a flow of a process in the first photographing mode. When the process is started, in step S1, the exposure configuration unit 103*a*-1 performs the exposure configuration (fixing) and in step S2, sets n=1 as an initial value. In step S3, the focus position configuration unit 103*a*-2 configures the focus position to the nth (here, n=1), and the image information acquisition unit 103*a*-3 acquires the image information and in step S4, stores the image information in the memory or the like. Next, in step S5, n=n+1 is set, and the process returns to step S3 and is repeated until $n_{max}$ images to be photographed in the first photographing mode are acquired.

FIG. 6C(b) is a flowchart that illustrates a flow of a process in the second photographing mode. When the process is started, in step S11, the focus position is fixed (here, m=1). In step S12, the exposure configuration unit 103*a*-1 changes the exposure configuration, and the image information acquisition unit 103*a*-3 acquires the image information and in step S13, stores the image information in the memory or the like. Next, in step S14, m=m+1 is set, and the process returns to step S12 and is repeated until mmax images to be photographed in the second photographing mode are acquired.

Here, in a case where the lens is driven by the actuator or the like to change the focus position, the angles of view of pieces of photographed image information are different among the images in different focus positions. In such a case, the differences in the angle of view or the like are corrected such that the objects overlap with each other among the images. As for a calculation method of a correction amount, plural feature points are extracted from a base image, a corresponding point search that searches for the points corresponding to the feature points in a reference image with respect to the area which contains the feature points is performed, the differences in position between the feature points and the corresponding points are thereby calculated, and the calculation method may thereby be realized. As the feature point, a point with which the differential value between a pixel of interest and peripheral pixels is large, and pixels and areas such as an outline and a corner, which are not flat, are extracted. In the corresponding point search, the degree of similarity or the degree of difference between a base area that contains the feature points and a reference area that serves as corresponding point candidates is evaluated by a sum of absolute difference (SAD), a sum of squared difference (SSD), or the like.

Figure 5:
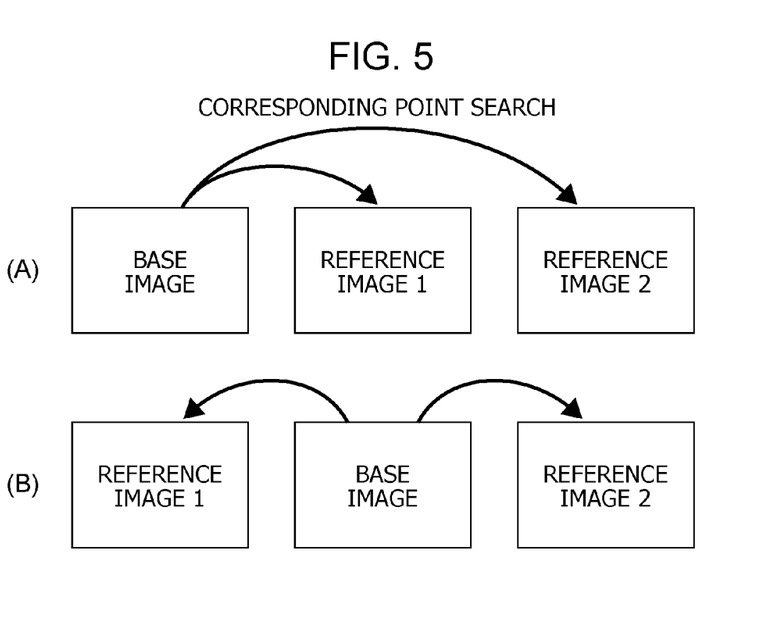
FIG. 5 is a diagram that illustrates the relationship between a base image and reference images in correction amount calculation.

In this case, for example, the correction amount is calculated not by using the image at one end among plural images as the base image and using the other images as the reference images as illustrated in FIG. 5(A) but by performing the corresponding point search among the images in which the focus positions are adjacent as illustrated in FIG. 5(B). Accordingly, the differences in the depth of field among the images, that is, the differences in the focus degree may be reduced. This enables the correction amount to be accurately calculated and is preferable.

Further, positioning may be performed for the plural images that are photographed while the focus position is fixed and the exposure configuration is changed. This is because the image sensor is possibly translated due to camera shake by the user in photographing, for example. A similar method to the above-described case where the focus position is changed and the exposure configuration is fixed may be applied to the correction amount in such a case. However, the corresponding point search has to be carried out after the gradation is corrected based on the difference in the exposure configuration. In addition, the base image from which the feature points are extracted is configured such that the exposure configurations are adjacent and the corresponding point search is thereby performed, and the differences among the images thereby become small. Accordingly, the search accuracy is improved, and the correction accuracy may thereby be improved.

FIG. 6A illustrates the relationship in the search for the feature points among photographed images in this embodiment and illustrates an image 1 focused in the close view, an image 2 focused in the intermediate view, and an image 3 focused in the distant view, which are acquired by performing photographing by changing the focus position, and an image 4 with a long light exposure time and an image 5 with a short light exposure time, which are acquired by performing photographing by changing the exposure configuration in the focus position of the image 3. In correction amount calculation among the images with different focus positions, the corresponding point search is performed while the image 2 is set as a base image A, the image 1 is set as a reference image 1, and the image 3 is set as a reference image 2. Meanwhile, in correction amount calculation among the images in different exposure configurations, the corresponding point search is performed while the image 3 is set as a base image B, the image 4 is set as a reference image 3, and the image 5 is set as a reference image 4. Accordingly, plural base images for which the correction amounts are calculated are configured.

Next, in a case where a correction conversion is performed based on the calculated correction amounts, the conversion is preferably performed by configuring the image with the narrowest angle of view as the base image. That is, performing other kinds of image correction with respect to the image with the narrowest angle of view enables areas that are not photographed to be minimized and is thus preferable.

In FIG. 6A, in a case where the image with the narrowest angle of view is the image 1, the correction conversion is performed for the images 2 to 5 with respect to the image 1. Accordingly, different base images are configured for the correction amount calculation and for the correction conversion. For example, in a case where the correction conversion is performed for the image 5 with respect to the image 1, the correction amount for the correction conversion of the image 5 to the image 1 is calculated from the correction amount calculated from the image 3 and the image 5, the correction amount calculated from the image 2 and the image 3, and the correction amount calculated from the image 1 and the image 2. Accordingly, the correction conversion may be performed for the images with respect to the base images.

After the objects in the respective images overlap with each other by the correction conversion, a composition process from the images is performed. First, an image in which the dynamic range is increased is composed from the images in different exposure configurations. The composition may be realized by selecting the pixel values of the images in accordance with the gradation values of the respective pixels. For example, in a case where the pixel of interest is a bright pixel, the pixel values are calculated by weighting the gradation values of the corresponding pixels of an image with a short light exposure time. In a case where the pixel of interest is a dark pixel, the pixel values are calculated by weighting the gradation values of the corresponding pixels of an image with a long light exposure time. In a case where the pixel of interest is not a bright or dark pixel, the pixel values are calculated by weighting the gradation values of the corresponding pixels of an image with an intermediate light exposure time. The composition may thereby be realized. Accordingly, an image in which the dynamic range is increased is generated. The gradation values of the images are calculated in consideration of the exposure configurations at times when the images are photographed. This is because in a case where the light exposure times are two times different, two times differences occur to the gradation values. Adjustment of the gradation value is performed with the image in the same exposure configuration as the exposure configuration in a case of photographing by changing the focus position serving as the base image, in consideration of a depth-of-field increasing process.

Meanwhile, among the images in different focus positions, pixels that have high contrast and are estimated to be in focus are selected from the images such that the composed image is in focus. For example, the differential value between the pixel of interest and the peripheral pixels is calculated and set as the focus degree, the weighted averages are obtained in accordance with the focus degrees of the corresponding pixels of the images, and the corresponding pixels of the composed image are thereby calculated. Accordingly, an image in which the depth of field is increased is generated.

Here, in a case where the dynamic range increasing process and the depth-of-field increasing process are performed independently from each other as described above, it is preferable to first perform the dynamic range increasing process. In FIG. 6A, as described above, because the exposure configurations of the images 1 to 3 are adjusted to the object in the close view, the pixels that correspond to the object in the distant view are possibly saturated, and the determination accuracy of the focus degree possibly decreases. That is, in a case where the depth of field is increased by the images 1 to 3, the object in the distant view is saturated. Thus, although the object in the distant view is in focus and properly photographed in the images in different exposure configurations, the pixel values are possibly not calculated due to the weight applied to the pixel values of the image 3. Accordingly, in a case where the depth of field is increased, an image in which the dynamic range is increased by the images 3 to 5 is used as the image in which the object in the distant view is in focus, and the object in the distant view may thereby be calculated with proper pixels.

Figure 7A:
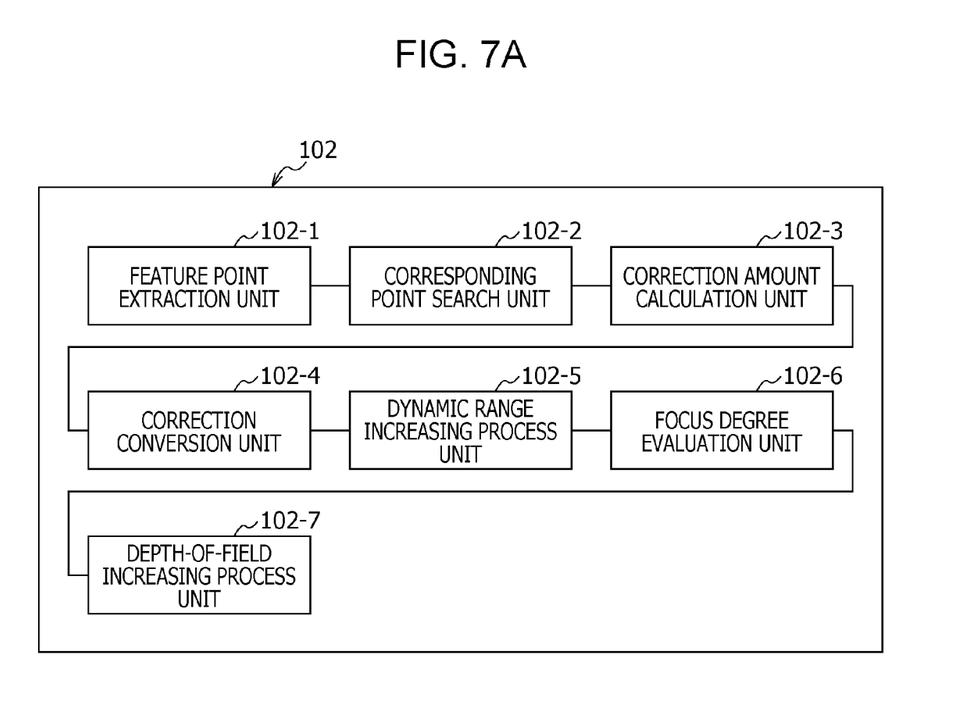
FIG. 7A is a function block diagram that illustrates one configuration example of an image processing unit.

FIG. 7A is a function block diagram that illustrates one configuration example of the image processing unit 102 of this embodiment.

The image processing unit 102 of this embodiment has a feature point extraction unit 102-1, a corresponding point search unit 102-2, a correction amount calculation unit 102-3, a correction amount conversion unit 102-4, a dynamic range increasing process unit 102-5, a focus degree evaluation unit 102-6, and a depth-of-field increasing process unit 102-7.

Figure 7B:
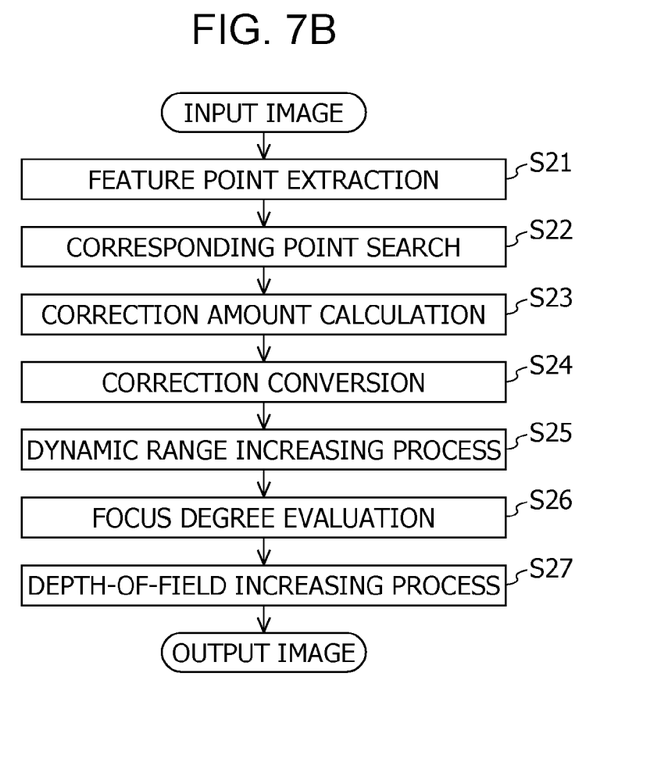
FIG. 7B is a flowchart that illustrates a flow of a process of the image processing unit.

FIG. 7B is a flowchart that illustrates a flow of a process. First, the base image is configured among images, in which the focus positions are adjacent, from input images, and the feature point extraction unit 102-1 extracts the feature points from the configured base image (step S21). Next, the corresponding point search unit 102-2 uses the extracted feature points to perform the corresponding point search with respect to the images that are configured as the reference images among the input images (step S22). The correction amount calculation unit 102-3 calculates the correction amount from the differences in the coordinates between the extracted feature points and the calculated corresponding points (step S23). Next, the correction amount conversion unit 102-4 performs the correction conversion based on the calculated correction amount with the image with a narrow angle of view serving as the base image (step S24). The dynamic range increasing process unit 102-5 uses the image in which offsets of the objects in different exposure configurations are corrected to perform the dynamic range increasing process (step S25). Next, the focus degree evaluation unit 102-6 evaluates the focus degrees among the images with different focus positions, which include the image in which the dynamic range is increased (step S26). The depth-of-field increasing process unit 102-7 increases the depth of field in accordance with the evaluated focus degrees and thereby provides an output image (step S27).

The above-described process enables an image in which the depth of field and the dynamic range are increased to be composed. The composed image is displayed by the image display unit 104 and stored in the image storage unit 105. That is, in order to realize the increases in the depth of field and the dynamic range for three focus positions and three kinds of exposure configurations in related art, 9 (3×3) images in total are requested because images are photographed in the respective focus positions and in the respective exposure configurations. However, the image capturing device of this embodiment may realize the increases in the depth of field and the dynamic range by 5 (3×1+2) images. That is, the time from photographing the first image to photographing the final image may be shortened, the influences of movement of the object and camera shake may be minimized, and an image with high image quality may thereby be composed. In addition, the memory amount may be reduced because the number of images that are used for the composition is small. Further, the processing amount may be reduced because the reference images are reduced. Further, the exposure configuration is performed for the object for which the focus position has been configured, the exposure configuration in accordance with the focus position is thus not requested, and the time before the start of photographing may be shortened.

As described above, the image capturing device that may compose the image in which the depth of field and the dynamic range are increased may be realized while high image quality is provided and the processing amount is reduced. Here, in this embodiment, the description is made about a case where the pieces of image information with three different focus positions are acquired. However, similar effects may be obtained even in a case where the number of pieces of acquired image information changes in accordance with optical characteristics of the image sensor 101, the increase magnitude of the depth of field, and so forth. Similarly, in this embodiment, the description is made about a case where pieces of image information in three kinds of different exposure configurations are acquired. However, similar effects may be obtained even in a case where the number of pieces of acquired image information changes in accordance with optical characteristics of the image sensor 101, the increase magnitude of the dynamic range, and so forth.

Further, in this embodiment, the description is made about a case where the dynamic range increasing process and the depth-of-field increasing process are sequentially performed. However, it is possible to enable the dynamic range increasing process and the depth-of-field increasing process to be simultaneously performed. For example, the focus degrees of the images 1 to 5 of the pixels are calculated and compared. In a case where the images 3 to 5 are selected, the pixel values are calculated with the values weighted by the gradation values of the images 3 to 5 and the focus degrees.

In addition, in this embodiment, the image photographing device is described. However, this embodiment may be applied to terminals that have an image capturing function and may be applied to various terminals such as cellular phones, smart phones, and tablet terminals, for example.

Second Embodiment

The configuration of an image capturing device in this embodiment is similar to the first embodiment. Thus, detailed descriptions of common components will not be made.

Compared to the image capturing device 100 of the first embodiment, the image capturing device in this embodiment is the same in a point that photographing is performed by changing the focus position in the first photographing mode (FIG. 6C(a)) but is different in a case where photographing is performed by changing the exposure configuration. In the first embodiment, compared to the exposure configuration that is fixed in performing photographing by changing the focus position in the second photographing mode (FIG. 6C(b)), the pieces of image information are acquired by performing photographing in the exposure configuration in which the light exposure time is extended and in the exposure configuration in which the light exposure configuration is shortened. However, in this embodiment, the image information in a different exposure configuration is acquired by photographing in either one of the exposure configuration in which the light exposure time is extended and the exposure configuration in which the light exposure time is shortened.

First, in a case where the exposure configuration is properly performed for an object for which the focus position is specified, the value in a case where the exposure configuration is properly performed for whole an image is calculated. The calculated exposure configuration value of whole the image is compared with the exposure configuration value of a specified object. As a result of the comparison, if whole the image is brighter than the specified object, photographing is performed in the exposure configuration in which the light exposure time is shortened in a case where the image information is acquired while the exposure configuration is changed. Conversely, if whole the image is darker than the specified object, photographing is performed in the exposure configuration in which the light exposure time is extended in a case where the image information is acquired while the exposure configuration is changed. That is, the brightness of objects except the specified object is estimated, and the number of photographed images is thereby reduced in a case where photographing is performed while the exposure configuration is changed. For example, exemplifying this by FIG. 6A, the depth of field and the dynamic range may be increased without photographing either one image of the image 4 and the image 5.

Accordingly, the exposure configuration is performed for the specified object, the brightness of the other objects is estimated, the number of pieces of image information that are requested for the composition is thereby reduced, and the photographing time is thereby reduced. Accordingly, an image with high image quality in which the influences of movement of the object and camera shake are reduced may be composed, and an image for which the processing time is reduced and in which the depth of field and the dynamic range are increased may be composed.

Here, the values of the exposure configurations are compared in order to estimate the brightness of objects except the specified object. However, similar effects may be obtained by statistical values of the gradation values such as the comparison between the average of gradation values of the periphery of the specified object and the average value of gradation of whole the image. Further, the gradation values or the exposure configuration value may be calculated in an area in which the ratio of the specified object is low in the estimation of the brightness of the objects other than the specified object. For example, the gradation values or the exposure configuration value of the peripheral area of the specified object may be compared with the gradation values or the exposure configuration value of areas except the peripheral area of the specified object.

Third Embodiment

The configuration of an image capturing device in this embodiment is similar to the first embodiment. Thus, detailed descriptions of common components will not be made.

This embodiment enables the increase magnitudes of the depth of field and the dynamic range to be appropriately configured by a user operation. For example, a configuration is made such that the increase magnitudes of the depth of field and the dynamic range may be configured to a level 1 to a level 5 or the like and such that the increase magnitude becomes large in a case where a configuration is performed to a high level. In a case where the increase magnitude of the depth of field is the level 5, the number of pieces of image information photographed by changing the focus position is increased compared to the level 1, and the increase magnitude of the depth of field is thereby increased. Meanwhile, in a case where the increase magnitude of the dynamic range is the level 5, the number of pieces of image information photographed by changing the exposure configuration is increased compared to the level 1, and the increase magnitude of the dynamic range is thereby increased.

Here, increasing the pieces of photographed image information results in an extended photographing time. Thus, in a case where the image quality is improved by giving priority to the influences on movement of the object and camera shake, the maximum value of the number of pieces of photographed image information is configured, and the ratios of the increase magnitudes of the depth of field and the dynamic range are thereby adjusted. Accordingly, an image of preference of the user may easily be composed.

Figure 8:
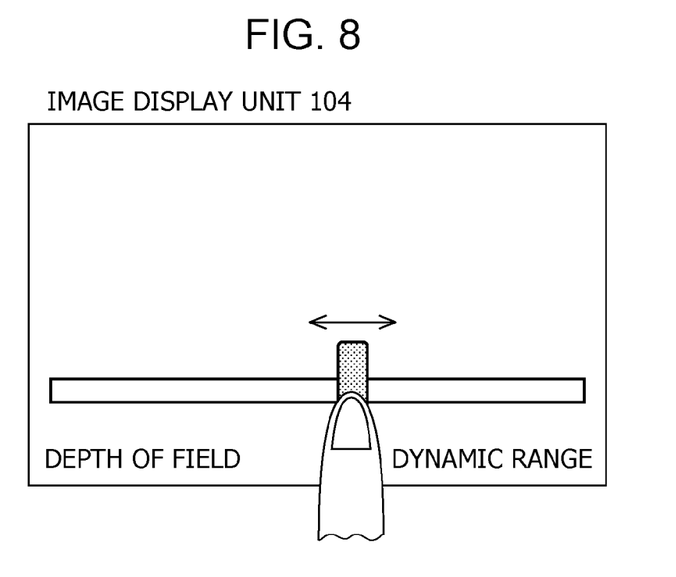
FIG. 8 illustrates an example of adjustment of increase magnitudes of a depth of field and a dynamic range.

For example, as illustrated in FIG. 8, the image display unit 104 is formed as a touch panel, and a slide bar is provided in which one end is set as the direction for elevating the ratio of the increase magnitude of the depth of field and the other end is set as the direction for elevating the ratio of the increase magnitude of the dynamic range. It is preferable that adjustment may thereby be made easily by user. Other modes are possible.

For example, in a case where the maximum number of pieces of photographed image information is configured as five and where the ratios of the increase magnitudes of the depth of field and the dynamic range are the same, photographing is performed in three focus positions and three kinds of exposure configurations. Meanwhile, in a case where the ratio of the increase magnitude of the depth of field is higher by one level, pieces of image information are acquired in four focus positions and two kinds of exposure configurations. Further, in a case where the ratio of the increase magnitude of the depth of field is lower by one level, pieces of image information are acquired in two focus positions and four kinds of exposure configurations.

In this embodiment, the above-described method enables the increase magnitudes of the depth of field and the dynamic range to be easily adjusted in accordance with the preference of the user.

The processing and control may be realized by software processing by a central processing unit (CPU) or a graphic processing unit (GPU) or by hardware processing by an application specific integrated circuit (ASIC) or a field programmable gate array (FPGA).

Further, in the above embodiments, the configurations and so forth illustrated in the attached drawings are not limited to those but may appropriately be modified within the scope where the effects of the present invention may be obtained. In addition, the present invention may be practiced with appropriate modifications without departing from the scope of the object of the present invention. Further, the configuration elements of the present invention may arbitrarily be selected, and inventions that include the selected configurations are included in the present invention.

Further, a program for realizing functions that are described in the embodiments is recorded in a computer-readable recording medium, the program that is recorded in the recording medium is read and executed by a computer system, and a process of each unit may thereby be performed. It should be noted that the "computer system" herein includes an OS and hardware such as peripheral apparatuses.

Further, the "computer system" includes a homepage providing environment (or display environment) in a case where the WWW system is used.

Further, "computer-readable recording media" are portable media such as flexible disks, magneto-optical disks, ROMs, and CD-ROMs and storage devices such as hard disks that are built in the computer system. In addition, the "computer readable recording media" include elements that dynamically retain the program for a short period of time like communication wires in a case where the program is transmitted via communication lines such as a network like the Internet and a telephone line and elements that retain the program for a certain period such as volatile memories in the computer systems that serve as servers or clients in the above case. Further, the program may realize a portion of the above-described functions and may be realized in combination with a program in which the above-described functions are already recorded in the computer system. At least a portion of the functions may be realized by hardware such an integrated circuit.

(Additional Matters)

The present invention includes the following disclosures.

(1) An image capturing device including: an image sensor that acquires image information in accordance with a focus position and an exposure which are configured; a control unit that controls the focus position and a configuration of the exposure; and an image processing unit that performs image processing for the image information, in which the control unit includes a first photographing mode in which the image information is acquired while the configuration of the exposure is fixed and the focus position is changed and a second photographing mode in which the image information is acquired while the focus position is fixed and the configuration of the exposure is changed, and the image processing unit performs the image processing from pieces of image information that are acquired in the first photographing mode and the second photographing mode.

In the image capturing device according to the present invention, images requested for composition may be photographed in short time, and an image in which the depth of field and the dynamic range are increased may be composed with high image quality and with a reduced processing amount.

(2) The image capturing device according to (1), in which the image information is acquired in the second photographing mode in a final focus position in which the image information is acquired in the first photographing mode.

Effects of above (1) may be obtained more specifically.

(3) The image capturing device according to (1) or (2), in which the exposure in the first photographing mode is configured from an area of the image information that is in focus in a first focus position in which the image information is acquired in the first photographing mode.

Effects of above (1) may be obtained more specifically.

(4) The image capturing device according to (3), in which the control unit compares an exposure configuration value in a case where the exposure is configured by using a different area from an area that is used to configure the exposure in the first photographing mode with an exposure configuration value of the first photographing mode and configures the exposure of the second photographing mode.

The brightness of objects except the specified object may be estimated, and the number of photographed images may thereby be reduced in a case where photographing is performed while the exposure configuration is changed.

(5) The image capturing device according to any one of (1) to (4), in which the control unit sequentially performs the first photographing mode and the second photographing mode.

(6) The image capturing device according to any one of (1) to (5) further including a user configuration unit by which a user configures an object to be focused.

(7) An image capturing method in an image capturing device that includes an image sensor which acquires image information in accordance with a focus position and an exposure which are configured, a control unit which controls the focus position and a configuration of the exposure, and an image processing unit which performs image processing for the image information, in which the control unit executes a first photographing mode in which the image information is acquired while the configuration of the exposure is fixed and the focus position is changed and a second photographing mode in which the image information is acquired while the focus position is fixed and the configuration of the exposure is changed, and the image processing unit performs the image processing from pieces of image information that are acquired in the first photographing mode and the second photographing mode.

(8) A program that causes a computer to execute the image capturing method according to above (7).

(9) A computer-readable recording medium that stores the program according to (8).

INDUSTRIAL APPLICABILITY

The present invention is usable for an image capturing device.

REFERENCE SIGNS LIST 100 image capturing device
101 image sensor
102 image processing unit
103 control unit
104 image display unit
105 image storage unit All publications, patents, and patent applications cited herein are incorporated herein by reference in their entirety.

The invention claimed is:

1. An image capturing device comprising: an image sensor that acquires image information in accordance with a focus position and an exposure which are configured; a control unit that controls the focus position and a configuration of the exposure; and an image processing unit that performs image processing for the image information, wherein the control unit includes a first photographing mode in which the image information is acquired while the configuration of the exposure is fixed and the focus position is changed and a second photographing mode in which the image information is acquired while the focus position is fixed and the configuration of the exposure is changed, and the image processing unit performs the image processing from pieces of image information that are acquired in the first photographing mode and the second photographing mode.

2. The image capturing device according to claim 1, wherein the image information is acquired in the second photographing mode in a final focus position in which the image information is acquired in the first photographing mode.

3. The image capturing device according to claim 1, wherein the exposure in the first photographing mode is configured from an area of the image information that is in focus in a first focus position in which the image information is acquired in the first photographing mode.

4. The image capturing device according to claim 3, wherein the control unit compares an exposure configuration value in a case where the exposure is configured by using a different area from an area that is used to configure the exposure in the first photographing mode with an exposure configuration value of the first photographing mode and configures the exposure of the second photographing mode.

5. The image capturing device according to claim 1, wherein the control unit sequentially performs the first photographing mode and the second photographing mode.

6. The image capturing device according to claim 1, further comprising: a user configuration unit by which a user configures an object to be focused.

7. An image capturing method in an image capturing device that includes an image sensor which acquires image information in accordance with a focus position and an exposure which are configured, a control unit which controls the focus position and a configuration of the exposure, and an image processing unit which performs image processing for the image information, wherein the control unit executes a first photographing mode in which the image information is acquired while the configuration of the exposure is fixed and the focus position is changed and a second photographing mode in which the image information is acquired while the focus position is fixed and the configuration of the exposure is changed, and the image processing unit performs the image processing from pieces of image information that are acquired in the first photographing mode and the second photographing mode.

8. A non-transitory computer-readable recording medium that stores a program that causes a computer to execute the image capturing method according to claim 7.

* * * * *